(12) United States Patent
Imbrogno

(10) Patent No.: US 12,251,759 B2
(45) Date of Patent: Mar. 18, 2025

(54) POWDER METAL PARTS WITH IMPROVED MACHINABILITY

(71) Applicant: Peter G. Imbrogno, Dubois, PA (US)

(72) Inventor: Peter G. Imbrogno, Dubois, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 26 days.

(21) Appl. No.: 18/312,678

(22) Filed: May 5, 2023

(65) Prior Publication Data
US 2023/0302536 A1   Sep. 28, 2023

Related U.S. Application Data

(62) Division of application No. 16/934,691, filed on Jul. 21, 2020, now Pat. No. 11,707,785.

(60) Provisional application No. 62/877,035, filed on Jul. 22, 2019.

(51) Int. Cl.
  *B22F 3/16*   (2006.01)

(52) U.S. Cl.
  CPC .......... *B22F 3/162* (2013.01); *B22F 2301/35* (2013.01); *B22F 2302/45* (2013.01)

(58) Field of Classification Search
  CPC ... B22F 3/162; B22F 2301/35; B22F 2302/45
  See application file for complete search history.

(56) References Cited

U.S. PATENT DOCUMENTS

2005/0274223 A1* 12/2005 Schade ............... C22C 33/0228
  75/252
2013/0009205 A1* 1/2013 Tsuzuki ............. H01L 29/0834
  257/140
2018/0236548 A1* 8/2018 Ishimine .............. B22F 1/0007

FOREIGN PATENT DOCUMENTS

WO   2005123973 A1   12/2005

OTHER PUBLICATIONS

"Synthesis of microcrystalline brownmillerite Ca2(Al,Fe)2O5 and its influence of mechanical properties to the class G oil-well cement", Cheng et al., Journal of Adhesion Science and Technology vol. 32, Issue 2, Jul. 18, 2017, pp. 125-138 (Cheng) (Year: 2017).*
Synthesis of microcrystalline brownmilleriite Ca2(Al,Fe)2O5 and its influence of mechanical properties to the class G oil-well cement, Cheng et al, Journal of Adhesion Science and Technology vol. 32, Issue 2, Jul. 18, 2017, pp. 125-138 (Cheng) (Year: 2017).

* cited by examiner

*Primary Examiner* — Humera N. Sheikh
*Assistant Examiner* — Kevin Ct Li
(74) *Attorney, Agent, or Firm* — Alvin T. Rockhill

(57) ABSTRACT

It has been unexpected found that the machinability and corrosion resistance of powder metal parts can be greatly improved by incorporating calcium aluminoferrite powder, such as naturally occurring brownmillerite powder ($Ca_2(Al, Fe)_2O_5$), into the part. Improved machinability is of enormous value in manufacturing countless parts where it is necessary or desirable to machine the part after it has been sintered, such as is frequently the case with gears, rotors and sprockets. In the practice of this invention, calcium aluminoferrite powder can also be incorporated into parts which will not necessarily be machined for the sole purpose of attaining better corrosion resistance. Surprisingly, the incorporation of the calcium aluminoferrite powder into such parts does not significantly compromise the strength, durability, or wear characteristics of the part and generally improves the service life of the part by providing better corrosion resistance.

19 Claims, No Drawings

POWDER METAL PARTS WITH IMPROVED MACHINABILITY

This application claims the benefit of U.S. patent application Ser. No. 16/934,691, filed on Jul. 7, 2020, which claims the benefit of U.S. Provisional Patent Application Ser. No. 62/877,035, filed on Jul. 22, 2019. The teachings of U.S. patent application Ser. No. 16/934,691 and U.S. Provisional Patent Application Ser. No. 62/877,035 are incorporated by reference herein in their entirety.

FIELD OF THE INVENTION

This invention relates to powder metal parts which have excellent machinability and excellent corrosion resistance. Such parts are of particular value in applications where it is necessary or desirable to machine the part after it is sintered, such as is frequently the case with gears, rotors, sprockets, and a wide variety of other parts. This invention is also of great value solely for the purpose of providing better corrosion resistance in the case of powder metal parts which will not necessarily be machined after being sintered.

BACKGROUND OF THE INVENTION

Powder metal technology can be utilized in manufacturing parts having intricate designs that frequently cannot be made by casting, forging or machining. In such applications, powder metal parts can typically be made at high volume levels at a reduced cost by virtue of requiring less labor. Accordingly, for economic and practical reasons, powdered metal parts are commonly used in manufacturing a wide variety of parts for use in countless applications. In any case, powder metallurgy can provide significant benefits in minimizing material and energy waste based on its features as a near-net shape technology compared to other manufacturing technologies.

Manufacturing parts using powder metal technology typically involves the steps of (1) placing a metal powder composition into a mold, (2) compressing the metal powder in the mold into the shape of the desired part under a pressure of 20 tons per square inch to 70 tons per square to make a preformed part (green metal part), (3) removing the green metal part from the mold, and (4) sintering the green metal part at an elevated temperature which is typically within the range of about 60% to about 90% of the melting point of the metal composition to produce the sintered metal part. The sintering temperature will normally be in the range of 1830° F. (1000° C.) to 2450° F. (1343° C.).

In many cases, after the powder metal part has been sintered it is necessary to machine the part to provide it with required design elements, to attain needed tolerances (dimensional accuracy), and to provide it with a specific needed precision geometry, such as cross holes, transverse grooves, and the like. Accordingly, the part may need to be drilled or ground to meet required specifications and/or to impart needed design features. For instance, it is frequently necessary to grind the gear teeth of sintered powder metal gears to attain the degree of surface smoothness that is required for the gear. Sintered powder metal parts are also frequently drilled or cut to impart the design features needed in the final product.

The machining of sintered powder metal parts is typically labor intensive and, of course, results in ordinary wear and tear on drills, grinders, cutting blades and other equipment utilized in machining such parts. For these reasons, machinability enhancers are typically added to powder metal compositions used in making parts that will subsequently be machined. Such machinability enhancers make the part easier to machine which reduces the time needed to machine the part, energy requirements, and wear and tear on the equipment used. Such machinability enhancers can conveniently be added into the powder metal composition utilized in manufacturing the part before it is compacted in making the preformed or green part which is subsequently sintered.

A wide variety of both metallic and non-metallic materials have been added to steel compositions to make it more easily workable. For example, lead, sulfur, bismuth, selenium, tellurium, manganese sulfide, and tin have been used as machinability enhancers. These additives are believed to work by lubricating the tool-chip interface, by decreasing the shear strength of the metal, and/or by increasing the brittleness of the chip. For instance, lead can improve the machinability of steel because it acts as an internal lubricant in the cutting zone. Since lead has poor shear strength, it allows the chip to slide more freely past the edge of the cutting tool. When lead is added in small quantities to steel, it can appreciably improve its machinability while not significantly affecting the strength of the steel. Sulphur is also known to improve the machinability of steel by forming low shear strength inclusions in the cutting zone. These inclusions are stress risers that weaken the steel which allows for it to deform more easily. For environmental reasons in recent years, bismuth, selenium, tellurium, manganese sulfide, and tin have generally replaced lead and sulfur as machinability enhancers.

Even though lead, sulfur, bismuth, selenium, tellurium, manganese sulfide, and tin are known to improve machinability characteristics they are generally detrimental to mechanical properties, such as strength and durability, and can also have a detrimental effect on dimensional stability during sintering. For these reasons, none of these materials can be used in manufacturing the types of high performance powder metal parts needed today in many applications.

For many years, manganese sulfide (MnS) has been widely recognized as the best machinability enhancing agent for manufacturing powder metal parts without significantly compromising mechanical properties. At a level of about 0.5 weight percent manganese sulfide has the ability to provide a significant improvement in ease of machining powder metal parts and is especially of value in turning and drilling iron-copper-carbon compositions. Manganese sulfide is believed to improve the machinability by acting as a solid lubricant, chip breaker and tool protector. However, the drawback of using manganese sulfide as a machinability enhancing agent is that it frequently causes stains on part surfaces and makes the part susceptible to corrosion. These problems have limited the use of manganese sulfide in applications where it is critical or important for the part to have a pristine appearance and to be corrosion resistant. In manufacturing such parts it sometimes is not possible to include manganese sulfide or any other machinability enhancing agent without destroying required mechanical properties, corrosion resistance, and/or surface appearance characteristics. In such cases, a machinability enhancing agent cannot be used and machining of the part without one is more difficult and expensive.

Various additives for improving the corrosion resistance and reducing the staining tendencies of parts made utilizing manganese sulfide have been utilized in various applications over the years. These additives include hexagonal boron nitride, calcium fluoride, silica containing oxides, and magnesium silicates, such as talc, enstatite, and the like. Some of these materials have proven to be useful in certain niche applications. However, all of them have drawbacks that have limited their widespread use. In any case, there remains to be a long felt, but unsatisfied need for a highly effective machinability enhancing agent that can be used without compromising the mechanical properties, corrosion resistance, or appearance of powder metal parts made therewith. In other words, it is important not to sacrifice the strength, durability, wear characteristics, service life, corrosion resistance, surface appearance or uniformity of the part in an endeavor to attaining better machinability.

SUMMARY OF THE INVENTION

This invention is based upon the unexpected discovery that calcium aluminoferrite powder can be incorporated into powder metal parts to improve the machinability thereof. Surprisingly, the incorporation of calcium aluminoferrite powder into such parts does not compromise the strength, durability, wear characteristics, stain resistance, corrosion resistance or service life of the part. Such parts can also be manufactured to a high level of tolerance and with good uniformity utilizing powder metal technology.

The present invention more specifically discloses a powder metal part which is comprised of a sintered powder metal composition, wherein the powder metal composition includes 0.05 weight percent to 5 weight percent of calcium aluminoferrite powder.

The subject invention further reveals a method for manufacturing a powder metal part having good machinability and good corrosion resistance which comprises the steps of (1) placing a metal powder composition into a mold having the desired shape of the part, wherein the metal powder composition is comprised of iron and a machinability enhancing agent which is comprised of calcium aluminoferrite powder, (2) compressing the metal powder in the mold into the shape of the part under a pressure of 20 tons per square inch to 70 tons per square inch to produce a green metal part, (3) removing the green metal part from the mold, and (4) sintering the green metal part at an elevated temperature which is typically within the range of about 60% to about 90% of the melting point of the metal composition to produce the sintered metal part.

The present invention also relates to a method of manufacturing a powder metal part which comprised machining a sintered powder metal part which contains 0.05 weight percent to 5 weight percent of calcium aluminoferrite powder by drilling, grinding, or cutting. Such parts include sprockets, rotors, and all types of gears, such as spur gears, helical gears, double helical gears, bevel gears, skew gears, hypoid gears, worm gears, and the like having external and/or internal gear profiles.

DETAILED DESCRIPTION OF THE INVENTION

The highly machinable parts of this invention can be made using conventional procedures for manufacturing powder metal parts. However, the powder metal composition utilized in making the part will include 0.05 weight percent to 5 weight percent of calcium aluminoferrite powder. Such a procedure normally includes the steps of (1) placing a metal powder composition into a mold having the desired shape of the part, (2) compressing the metal powder in the mold into the shape of the part under a pressure of 20 tons per square inch to 70 tons per square inch to produce a green metal part, (3) removing the green metal part from the mold, and (4) sintering the green metal part at an elevated temperature which is typically within the range of about 60% to about 90% of the melting point of the metal composition to produce the sintered metal part.

In manufacturing the powder metal parts of this invention a mold of the desired shape is filled with a powder metal composition. After the metal powder formulation is introduced into the mold the powder is compressed under high pressure, typically from 20 to 70 tons per inch$^2$ (tsi) and more typically 40 to 65 tons per inch$^2$ (tsi). This compressed part or preform is then considered to be green or uncured. The green part is then cured or sintered by heating in a sintering furnace, such as an electric or gas-fired belt or batch sintering furnace, for a predetermined time at high temperature in an inert environment or reducing atmosphere. Nitrogen, vacuum and Noble gases, such as helium or argon, are examples of such inert protective environments. Metal powders can be sintered in the solid state with bonding by diffusion rather than melting and re-solidification. Also, sintering may result in a decrease in density depending on the composition and sintering temperature. For instance, chromium containing compositions typically maintain or decrease in density while nickel containing compositions generally increase in density.

Typically, the sintering temperature utilized will be about 60% to about 90% of the melting point of the metal composition being employed. The sintering temperature will normally be in the range of 1830° F. (1000° C.) to 2450° F. (1343° C.). The sintering temperature will more typically be within the range of 2000° F. (1093° C.) to about 2400° F. (1316° C.). In any case, the appropriate sintering temperature and time-at-temperature will depend on several factors, including the exact chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at temperature which is within the range of 2000° F. (1093° C.) to 2450° F. (1343° C.) for approximately 30 minutes in a protective atmosphere to sinter the metal.

The final density of the part will vary widely depending on its composition and the particular pressing and sintering parameters employed. The density of the final part will normally be within the range of 6.6 g/cc to 7.5 g/cc. The final part will typically have a density which is within the range of 6.7 g/cc to 7.4 g/cc and will commonly have a density which is within the range of 6.9 g/cc to 7.3 g/cc.

The metal powders that can be utilized in manufacturing powder metal parts are typically a substantially homogenous powder including a single prealloyed alloyed or unalloyed metal powder or a blend of one or more such powders and, optionally, other metallurgical and non-metallurgical additives such as, for example, lubricants. In any case, the metal powder composition used in the practice of this invention will contain 0.05 weight percent to 5 weight percent of calcium aluminoferrite powder.

The powder metal composition will generally contain from 0.08 weight percent to 3 weight percent of the calcium aluminoferrite powder and will more generally contain from 0.1 weight percent to 2 weight percent of the calcium aluminoferrite powder. It is normally preferred for the calcium aluminoferrite powder to be present in the metal composition at a level which is within the range of 0.15 weight percent to 1 weight percent with it being more preferred for the coarse graphite to be present in the metal composition at a level which is within the range of 0.2 weight percent to 0.5 weight percent.

The calcium aluminoferrite powder can be naturally occurring brownmillerite powder of the formula: $Ca_2(Al,Fe)_2O_5$, or it can be synthetic calcium aluminoferrite powder. The calcium aluminoferrite powder used in the practice of this invention typically has an average particle size of less than 75 microns and preferably less than 63 microns. Powder of the desired particle size can be made by any appropriate grinding means, such as by using a ball mill. In any case, the calcium aluminoferrite is a composite oxide powder which includes 30 weight percent to 50 weight percent $Al_2O_3$, 30 weight percent to 50 weight percent CaO, and 10 weight percent to 30 weight percent $Fe_2O_3$. The calcium aluminoferrite will generally include 35 weight percent to 45 weight percent $Al_2O_3$, 32 weight percent to 45 weight percent CaO, and 12 weight percent to 28 weight percent $Fe_2O_3$. The calcium aluminoferrite will typically include 36 weight percent to 44 weight percent $Al_2O_3$, 34 weight percent to 44 weight percent CaO, and 12 weight percent to 25 weight percent $Fe_2O_3$. The calcium aluminoferrite will more typically include 36 weight percent to 44 weight percent $Al_2O_3$, 34 weight percent to 44 weight percent CaO, and 12 weight percent to 20 weight percent $Fe_2O_3$. The calcium aluminoferrite will frequently include 38 weight percent to 42 weight percent $Al_2O_3$, 36 weight percent to 42 weight percent CaO, and 13 weight percent to 17 weight percent $Fe_2O_3$. The calcium aluminoferrite compositions that are useful in the practice of this invention will normally have a maximum $SiO_2$ contain of 7 weight percent, a maximum MgO content of 1.5 weight percent, and a maximum $SO_3$ content of 0.5 weight percent. The $Fe_2O_3$ can beneficially be included at a level which is within the range of 15 weight percent to 20 weight percent, 20 weight percent to 25 weight percent, or 25 weight percent to 30 weight percent, basis upon the total weight of the machinability enhancing agent.

The base metal powders to which the calcium aluminoferrite powder is added in manufacturing powder metal parts in accordance with this invention are typically a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three conventional types of base metal powders used to make powder metal mixes and parts. The most common base metal powders are homogeneous elemental powders such as iron, copper, nickel and molybdenum. These are blended together, along with additives such as lubricants and the coarse graphite, and molded as a mixture. A second possibility is to use pre-alloyed powders, such as an iron-nickel-molybdenum steel. In this case, the alloy is formed in the melt prior to atomization and each powder particle is a small ingot having the same composition as the melt. Again, additives of the coarse graphite, lubricant and elemental powders may be added to make the mix. A third type is known as "diffusion bonded" powders. In this case, an elemental powder, such as iron, is mixed with a second elemental powder or oxide of a powder, and is subsequently sintered at low temperatures so partial diffusion of the powders occurs. This yields a powder with fairly good compressibility which shows little tendency to separate during processing. While iron is the most common metal powder, powders of other metals such as aluminum, copper, tungsten, molybdenum and the like may also be used. Also, as used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, silicon, and chromium. Copper and nickel can also optionally be present in pre-alloyed base metal powder compositions. Typically, the base metal powder will contain at least 95 weight percent iron and will preferably contain at least 97 weight percent iron.

At least four types of metallic iron powders are available. Electrolytic iron, sponge iron, carbonyl iron and nanoparticle sized iron are made by a number of processes. Electrolytic iron is made via the electrolysis of iron oxide, and is available in annealed and unannealed form from, for example, OM Group, Inc., which is now owned by North American Hoganas, Inc. Sponge iron is also available from North American Hoganas, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2$/kg), while hydrogen-reduced sponge iron typically has a surface area of about 200 $m^2$/kg. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Other additives in addition to the coarse graphite may also be used in molding the green part.

After being sintered, the part made has improved machinability by virtue of containing the calcium aluminoferrite powder which facilitates the ease of drilling, grinding, cutting, and other machining operations. The part accordingly can be machined as needed with reduced requirements for labor, reduced energy consumption, and less wear on machining tools, such as drill bits, grinders, and cutting blades. All of these benefits result in a greatly reduced manufacturing cost and also frequently lead to a higher quality part having enhanced corrosion and stain resistance.

After being machined the sintered part can optionally be further processed by (1) densifying the surface of the sintered metal part by shot-peening to produce a densified metal part, (2) compacting the surface of the part with a diamond coated arbor to further densify the surface of the part, (3) slurry finishing the powder metal part to remove surface burrs, (4) carburizing the sintered metal part to produce a carburized metal part, (5) tempering the metal part at an elevated temperature which is sufficient to stress relieve the part to produce a tempered metal part, (6) tape polishing the surface of the part to further improve the surface finish of the part, (7) washing to clean the surface of the metal part, and/or (8) rinsing the metal part with a rust inhibitor.

This invention is illustrated by the following examples that are merely for the purpose of illustration and are not to be regarded as limiting the scope of the invention or the manner in which it can be practiced. Unless specifically indicated otherwise, parts and percentages are given by weight and the Mesh size given were determined using U.S. Standard test sieves.

Example 1 and Comparative Examples 2-4

In this series of experiments a series of iron-copper-carbon test bars where made using conventional powder metal technology. These test bars were made using machinability enhancing agents at the levels and having the compositions shown in Table 1 with the exception of the test bar made as a control (Comparative Example 2) which did not include any type of machinability enhancing agent. The density, RB hardness, and total carbon content of the test samples made are also reported in Table 1.

TABLE 1

| | Example | | | |
|---|---|---|---|---|
| | 1 | 2 | 3 | 4 |
| % Machinability Agent* | 0.3 | 0.0 | 0.5 | 0.3 |
| Composition of Machinability Enhancing Agent | | | | |
| % $Al_2O_3$ | ~42 | 0.0 | 0.0 | ~52 |
| % CaO | ~38 | 0.0 | 0.0 | ≤40 |
| % $Fe_2O_3$ | ~15 | 0.0 | 0.0 | ≤3 |
| % $SiO_2$ | ≤6 | 0.0 | 0.0 | ≤6 |
| % MgO | ≤1.5 | 0.0 | 0.0 | ≤1.5 |
| % $SO_3$ | ≤0.4 | 0.0 | 0.0 | ≤0.4 |
| % MnS | 0.0 | 0.0 | 100.0 | 0.0 |
| Powder Metal Test Bar Properties | | | | |
| Density (g/cc) | 6.92 | 6.96 | 6.92 | 6.93 |
| RB Hardness | 77.2 | 76.9 | 76.3 | 78.5 |
| % Total Carbon | 0.755 | 0.727 | 0.782 | 0.747 |

*The machinability enhancing agent used in Example 1 was calcium aluminoferrite powder. The calcium aluminoferrite powder is reported to have a bulk density of ~1.15 g/cm³, a specific gravity of 3.0-3.1 g/cm3, a melting point of ~1350° C. (2500° F.), and a particle size wherein <25% is retained on a 325 mesh screen.

The machinability enhancing agent used in Comparative Example 4 was a second form of calcium aluminoferrite powdered material with a bulk density of ~1.0 g/cm3, a specific gravity of 3.0-3.1 g/cm3, a melting point of ~1440° C. (2624° F.), and a particle size wherein <30% is retained on a 325 mesh screen.

The mechanical properties, machinability, and corrosion resistance of the test bars made were determined and the results of this testing is reported in Table 2. The test samples were cut to determine machinability with the machining parameters used being as follows:

Feed Rate: 0.08 inch/rev (2 mm/rev)
Surface Speed: 900 SFM
Depth of Cut: 0.025 inch (0.635 mm)
Cycle Time: ~4 minites per sample (four cuts)
Surface Area of K-2004 (prior to first cut): 15.17 in²
Surface Area of 4 inch Carrier Face: ~12.57 in²
Insert: 2NUCCGA 32.52 HS BN7500 (supplier by REBCO)
Insert Holder: Steel 0.625 inch×6 inch Swiss Style Square Shank Tool Holder to hold a Positive CCMT 32.51 at −5° Lead (Purchased from Sumitomo)

TABLE 2

| | Example | | | |
|---|---|---|---|---|
| | 1 | 2 | 3 | 4 |
| Mechanical Properties | | | | |
| Apparent (RB) | 86 | 84 | 85 | 86 |
| Transverse Rupture Strength (MPa) | 1,021 | 1,028 | 971 | 1,021 |
| Size Change (mm/mm) | 0.06833 | 0.06858 | 0.07468 | 0.07061 |
| Sinter Braze Test | Passed | Passed | Passed | Passed |
| Machinability and Corrosion Resistance | | | | |
| # of Turns per Tool | 3,200+ | 560 | 3,200+ | 3,200+ |
| Days to Rust on Machined Surface** | >21 | 7 | 7** | 14 |
| Machined Surface Finish After 25 Cuts (Ra) | 17.5 | 8.0 | 19.5 | 11.5 |
| Machined Surface Finish After 400 Cuts (Ra) | 17.5 | 10.5 | 27.5 | 15.5 |
| Machined Surface Finish After 800 Cuts (Ra) | 18.5 | 9.0 | 29.0 | 16.5 |

**The test samples were placed in a humidity chamber with the number of days until rust could be visually detected.

It should be noted that the test sample of Comparative Example 3 which utilized MnS as a machinability enhancing agent was very badly rusted after being in the humidity chamber for only 7 days. This is in contrast to Example 1 which utilized calcium aluminoferrite powder as a machinability enhancing agent and wherein no rusting could be detected after being aged in the humidity chamber for over 21 days.

As can be seen from Table 2, the test samples of Example 1 showed excellent machinability and exhibited superior rust resistance to all of the other comparative examples. Comparative Example 2, which did not include a machinability enhancing agent proved to be extremely difficult to process. On the other hand, Comparative Examples 3 and 4 naturally showed improved machinability by virtue of including a machinability enhancing agent, but exhibited poor corrosion resistance. The test samples made in accordance with this invention utilizing calcium aluminoferrite powder as a machinability enhancing agent (Example 1) were the only ones that proved to exhibit both good machinability and excellent corrosion resistance. In fact, the samples made in accordance with this invention proved to have better corrosion resistance than the test specimens made without including any machinability enhancing agent (Comparative Example 2). In other words, by manufacturing powder metal parts in accordance with this invention it is possible to make high quality corrosion resistant parts that could not conventionally be made without encountering difficult machinability.

While certain representative embodiments and details have been shown for the purpose of illustrating the subject invention, it will be apparent to those skilled in this art that various changes and modifications can be made therein without departing from the scope of the subject invention.

What is claimed is:
1. A method for manufacturing a powder metal part having good machinability and good corrosion resistance which comprises the steps of: placing a metal powder composition into a mold having the desired shape of the part, wherein the metal powder composition is comprised of iron and a machinability enhancing agent which is comprised of calcium aluminoferrite powder, wherein the calcium aluminoferrite powder is present in the metal powder composition at a level which is within the range of 0.08 weight percent to 3 weight percent, wherein the calcium aluminoferrite powder is a brownmillerite powder of the general formula $Ca_2(Al,Fe)_2O_5$ which is comprised of 30 weight percent to 50 weight percent $Al_2O_3$, 30 weight percent to 50 weight percent CaO, and 10 weight percent to 30 weight percent $Fe_2O_3$, basis upon the total weight of the machinability enhancing agent; compressing the metal powder in the mold into the shape of the part under a pressure of 20 tons per square inch to 70 tons per square inch to produce a metal green part; removing the green metal part from the mold; sintering the green metal part at an elevated temperature within the range of about 60% to about 90% of the melting point of the metal composition to produce the sintered metal part; and machining the sintered metal part by drilling, grinding, or cutting.

2. The method for manufacturing a powder metal part having good machinability and good corrosion resistance as specified in claim 1 wherein the calcium aluminoferrite powder has an average particle size of less than 75 microns.

3. The method of manufacturing the power metal part of claim 1 wherein the machining is done by drilling.

4. The method of manufacturing the power metal part of claim 1 wherein the machining is done by grinding.

5. The method of manufacturing the power metal part of claim 1 wherein the machining is done by cutting.

6. The method for manufacturing a powder metal part having good machinability and good corrosion resistance as specified in claim 1 wherein the brownmillerite powder has an average particle size of less than 63 microns.

7. The method for manufacturing a powder metal part having good machinability and good corrosion resistance as specified in claim 1 wherein the calcium aluminoferrite powder is comprised of 35 weight percent to 45 weight percent $Al_2O_3$, 32 weight percent to 45 weight percent CaO, and 12 weight percent to 28 weight percent $Fe_2O_3$, basis upon the total weight of the machinability enhancing agent.

8. The method for manufacturing a powder metal part having good machinability and good corrosion resistance as specified in claim 1 wherein the calcium aluminoferrite powder is comprised of 36 weight percent to 44 weight percent $Al_2O_3$, 34 weight percent to 44 weight percent CaO, and 12 weight percent to 25 weight percent $Fe_2O_3$, basis upon the total weight of the machinability enhancing agent.

9. The method for manufacturing a powder metal part having good machinability and good corrosion resistance as specified in claim 1 wherein the calcium aluminoferrite powder is comprised of 36 weight percent to 44 weight percent $Al_2O_3$, 34 weight percent to 44 weight percent CaO, and 12 weight percent to 20 weight percent $Fe_2O_3$, basis upon the total weight of the machinability enhancing agent.

10. The method for manufacturing a powder metal part having good machinability and good corrosion resistance as specified in claim 1 wherein the calcium aluminoferrite powder is comprised of 38 weight percent to 42 weight percent $Al_2O_3$, 36 weight percent to 42 weight percent CaO, and 13 weight percent to 17 weight percent $Fe_2O_3$, basis upon the total weight of the machinability enhancing agent.

11. The method for manufacturing a powder metal part having good machinability and good corrosion resistance as specified in claim 1 wherein the $Fe_2O_3$ is present at a level which is within the range of 15 weight percent to 20 weight percent, basis upon the total weight of the machinability enhancing agent.

12. The method for manufacturing a powder metal part having good machinability and good corrosion resistance as specified in claim 1 wherein the $Fe_2O_3$ is present at a level which is within the range of 20 weight percent to 25 weight percent, basis upon the total weight of the machinability enhancing agent.

13. The method for manufacturing a powder metal part having good machinability and good corrosion resistance as specified in claim 1 wherein the $Fe_2O_3$ is present at a level which is within the range of 25 weight percent to 30 weight percent, basis upon the total weight of the machinability enhancing agent.

14. The method for manufacturing a powder metal part having good machinability and good corrosion resistance as specified in claim 1 wherein the powder metal part is a gear.

15. The method for manufacturing a powder metal part having good machinability and good corrosion resistance as specified in claim 1 wherein the powder metal part is a rotor.

16. The method for manufacturing a powder metal part having good machinability and good corrosion resistance as specified in claim 1 wherein the powder metal part is a sprocket.

17. The method for manufacturing a powder metal part having good machinability and good corrosion resistance as specified in claim 1 wherein the powder metal part is a spur gear.

18. The method for manufacturing a powder metal part having good machinability and good corrosion resistance as specified in claim 1 wherein the powder metal part is a helical gear.

19. The method for manufacturing a powder metal part having good machinability and good corrosion resistance as specified in claim 1 which further comprises carburizing the sintered metal part after it has been machined.

* * * * *